United States Patent [19]
Schnell

[11] Patent Number: 5,422,437
[45] Date of Patent: Jun. 6, 1995

[54] ELECTRICAL CONNECTOR ASSEMBLY

[75] Inventor: Kenneth R. Schnell, South Bend, Ind.

[73] Assignee: Hubbell Incorporated, Orange, Conn.

[21] Appl. No.: 47,191

[22] Filed: Apr. 16, 1993

[51] Int. Cl.[6] .............................................. H02G 3/22
[52] U.S. Cl. ................................ 174/65 R; 174/153 R
[58] Field of Search ............ 174/65 R, 153 R, 153 G, 174/65 G, 65 SS; 285/158; 248/56

[56] References Cited

U.S. PATENT DOCUMENTS

| | | | |
|---|---|---|---|
| 1,750,257 | 3/1930 | Bonnell. | |
| 2,420,826 | 5/1947 | Irrgang | 174/153 |
| 2,454,767 | 11/1948 | Brushaber | 285/123 |
| 2,952,730 | 9/1960 | Simonds | 174/153 |
| 3,243,206 | 3/1966 | Samer | 174/65 |
| 3,349,946 | 10/1967 | Lee | 174/65 |
| 3,631,738 | 1/1970 | Harper | 285/162 X |
| 4,248,459 | 2/1981 | Pate et al. | 285/319 |
| 4,302,035 | 11/1981 | Ochwat | 285/158 |
| 4,324,424 | 4/1982 | Woodliff et al. | 285/158 |
| 4,468,535 | 8/1984 | Law | 174/65 |
| 4,494,779 | 1/1985 | Neff et al. | 285/159 |
| 4,578,528 | 3/1986 | Borsh et al. | 174/65 |
| 4,616,105 | 10/1986 | Borsh | 174/65 |
| 4,711,472 | 12/1987 | Schnell | 285/162 |
| 4,864,080 | 9/1989 | Fochler et al. | 174/65 |
| 5,021,610 | 6/1991 | Roberts | 174/65 |
| 5,068,496 | 11/1991 | Favalora | 285/162 X |
| 5,200,575 | 4/1993 | Sheehan | 174/65 R |
| 5,204,499 | 4/1993 | Favalora | 174/65 R |
| 5,276,280 | 1/1994 | Ball | 174/65 R |

Primary Examiner—Leo P. Picard
Assistant Examiner—Paramita Ghosh
Attorney, Agent, or Firm—Jerry M. Presson; David L. Tarnoff

[57] ABSTRACT

An electrical connector assembly for coupling non-metallic electrical conduit to an electrical box via a snap-fit. The electrical connector assembly includes a snap nut adaptor with an annular groove at one end forming a first mating member, and a conduit connector with resilient latch tabs forming a second mating member. Upon inserting the snap nut adaptor through a hole or knockout opening in an electrical box, the conduit connector is securely coupled thereto by inserting it over the snap nut adaptor until the latch tabs engage the annular groove via a snap-fit.

14 Claims, 2 Drawing Sheets

ELECTRICAL CONNECTOR ASSEMBLY

FIELD OF THE INVENTION

This invention relates to an electrical connector assembly for coupling non-metallic conduit to an electrical box, especially in connection with conduits and electrical boxes embedded within concrete applications. More specifically, the invention relates to an electric connector assembly including a plastic snap nut adaptor and an electrical conduit connector for quickly coupling non-metallic conduit to an electrical box via snap-fit.

BACKGROUND OF THE INVENTION

Presently, electrical connectors are utilized for mechanically connecting electrical conduits containing electrical wires to electrical junction boxes. In many applications, it is often desired to use non-metallic conduit for carrying one electrical wiring. Accordingly, numerous electrical connectors have been developed for attaching non-metallic conduits to electrical boxes. Some of these electrical connectors are especially designed for connecting a non-metallic conduit to an electrical box which are embedded in poured concrete. Thus, in such concrete applications, it is necessary to use a connector which will provide a concrete tight seal between the conduit and the electrical box.

One example of a prior electrical connector is disclosed in U.S. Pat. No. 4,711,472 to Schnell, which illustrates a one-piece, snap-fit type connector. However, this connector has several disadvantages. First, this connector is somewhat difficult to assemble with steel electrical boxes, since often, during the process of snapping the connector into the hole or knockout opening of the electrical box, the latching tabs of the connector break. Second, even if the connector does not break during coupling of the connector to the electrical box, the latching tabs which hold the connector within the knockout opening of the box often shears when the conduit is stepped on. In particular in a pre-concrete floor, the conduits and boxes are embedded and hidden beneath the concrete causing workers to inadvertently step on the conduits and thus break the connector at the latch tabs.

Another type of electrical connector used by many electricians in cement applications utilizes a threaded tubular member and a nut for securing the connector to the electrical box. Accordingly, these threaded screw type connectors also have disadvantages. First, they are difficult and time consuming to install since they must be secured to the box by a threaded nut. Second, the threaded screw type connectors are typically expensive to manufacture since the connector must formed with threaded and the connector requires a threaded nut.

In addition, these prior electrical connectors require suppliers and installers of electrical equipment to keep an inventory of both electrical connector for coupling non-metallic conduits to electrical boxes, as well as electrical connectors for coupling sections of non-metallic conduit together. Thus, this requirement of having to keep both types of electrical connectors on the construction site is cumbersome and awkward.

Examples of some prior electrical connectors are disclosed in the following U.S. Pat. Nos.: 1,750,257 to Bonnell; 2,454,767 to Brushaber; 3,243,206 to Samer; 3,349,946 to Lee; 4,324,424 to Woodliff et al; 4,468,535 to Law; and 5,021,610 to Roberts.

Thus, a need in the electrical art exists to provide an improved electrical connector assembly for coupling non-metallic conduit to an electrical box, which is easy to install and which resists breaking. This invention addresses this need in the art, along with other needs which will become apparent to those skilled in the art once given this disclosure.

SUMMARY OF THE INVENTION

Accordingly, a primary object of the invention is to provide an electrical connector assembly for coupling a non-metallic conduit to an electrical box in concrete applications which is easy to install within the knockout opening of an electrical box.

Another object of the invention is to provide an electrical connector assembling for coupling a non-metallic conduit to an electrical box which can be used in concrete applications, and which does not require either screwing the connector into the knockout opening of an electrical box or using a threaded nut.

A further object of the invention is to provide an electrical connector assembly which eliminates the need for two different types of connectors at the construction site for coupling non-metallic conduit to electrical boxes, and for coupling one non-metallic conduit to another non-metallic conduit.

Still a further object of the invention is to provide an electrical connector assembly which will resist breaking upon installation into the knockout opening of an electrical box.

Yet a further object of the invention is to provide an electrical connector assembly which will resist shearing if stepped on at the construction site.

A further object of the invention is to provide an electrical connector for coupling a non-metallic conduit to an electrical box which is relatively inexpensive to manufacture.

The foregoing objects are basically attained by providing an electrical connector assembly for coupling an electrical conduit to an opening in an electrical box, the combination comprising: a first tubular member having a first end, a second end, and a first conduit passageway extending between the first end and the second end; a second tubular member having a first end, a second end, a second conduit passageway extending between the first and second ends of the second tubular member, and connecting members for connecting the electrical conduit to the second tubular member; and coupling members coupled to the first and second tubular members for coupling the first and second tubular members together and for engaging inside and outside surfaces of a wall of the electrical box when coupled to the electrical box, the coupling members including a first surface resiliently coupled to one of said tubular members for permitting transverse biasing, a second surface coupled to the other of the tubular members and facing in a direction opposite to the first surface for engagement with the first surface, first engaging surface coupled to one of the tubular members for engaging one of the surfaces of the electrical box and having a third surface coupled to the tubular member with the first surface coupled thereto and facing in a direction opposite to the first surface for engagement with one of the surfaces of the electrical box, and second engaging surface coupled to the other of the tubular members, for engaging the other of the surfaces of the electrical box and having a fourth surface coupled to the tubular member with the second surface coupled thereto and facing in a direction opposite to the third surface for engagement with the other of the surfaces of the electrical box.

Other objects, advantages and salient features of the invention will become apparent from the following detailed description, which, taken in conjunction with the annexed drawings, discloses a preferred embodiment of the invention.

BRIEF DESCRIPTION OF THE DRAWINGS

Referring now to the drawings which form part of this ordinal disclosure.

DETAILED DESCRIPTION OF THE INVENTION

Figure 1:
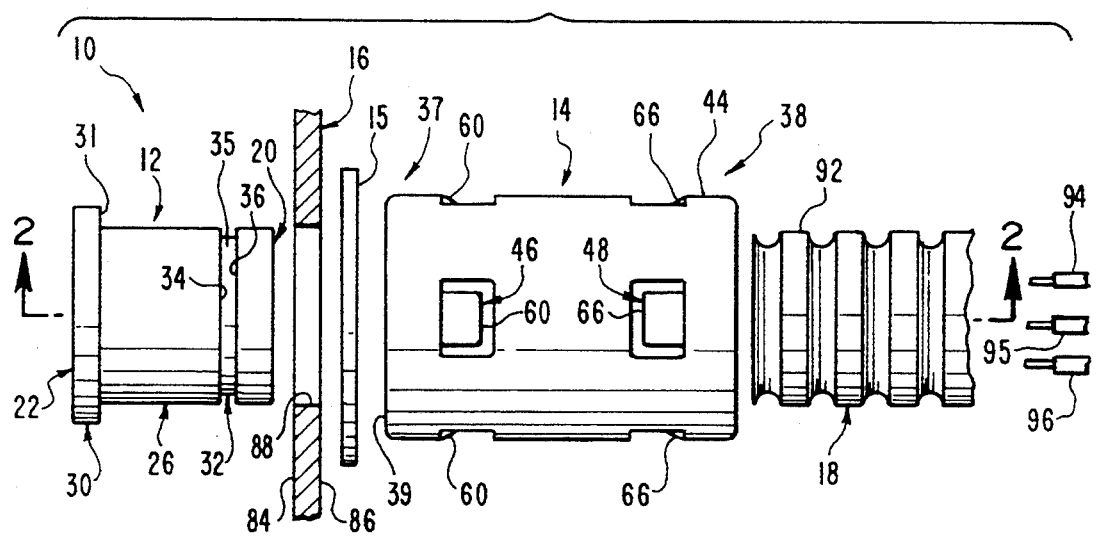
FIG. 1 is an exploded side elevational view of an electrical connector assembly in accordance with the present invention.
Figure 2:
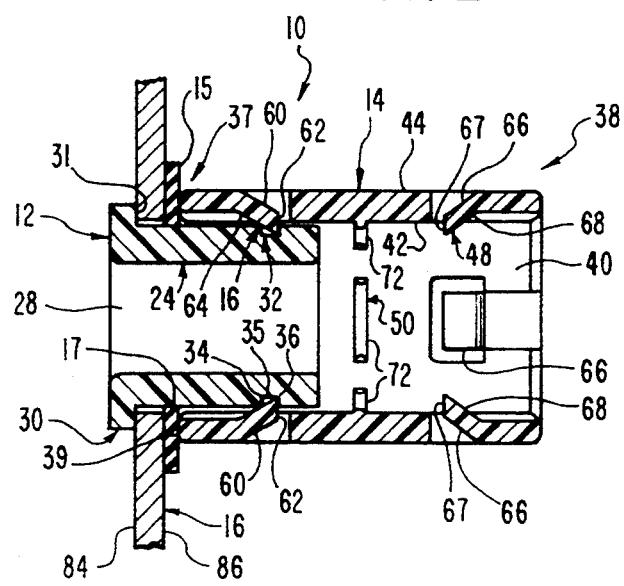
FIG. 2 is a longitudinal cross-sectional view of the electrical connector assembly of FIG. 1 taken along line 2—2 with the electrical connector assembly coupled to an electrical box with the conduit removed.
Figure 3:
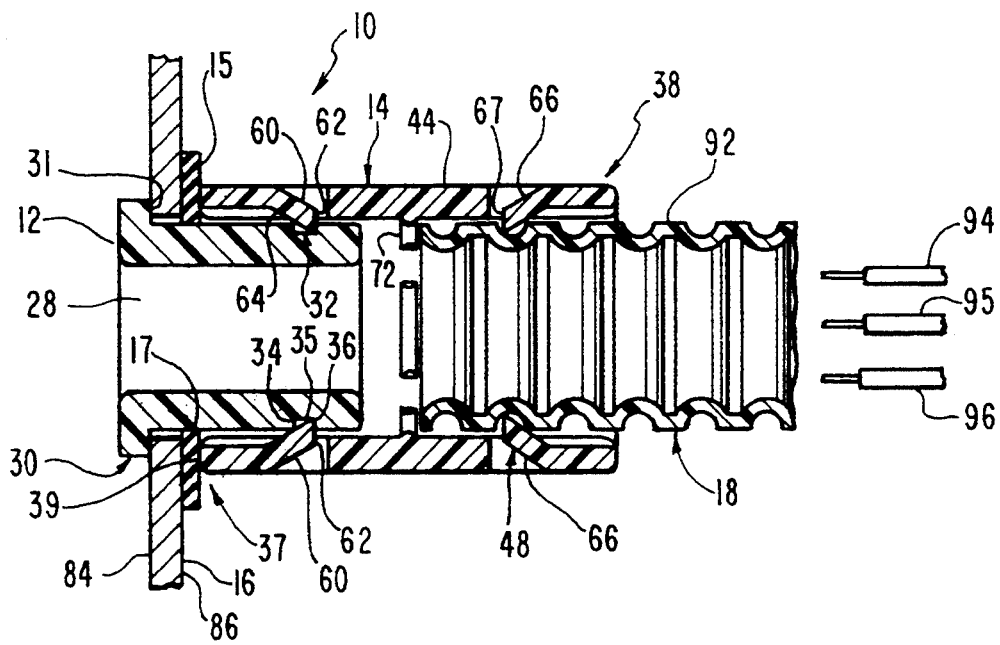
FIG. 3 is a longitudinal cross-sectional view of the electrical connector assembly of FIG. 2 with the conduit inserted therein.

As seen in FIGS. 1 and 2, an electrical connector assembly 10 in accordance with the present invention is illustrated, and includes a male member or snap nut adaptor 12 coupled to a female member or conduit connector 14 via a snap-fit. Snap nut adaptor 12 fixedly couples conduit connector 14 to an electrical box 16, and conduit connector 14 securely couples an electrical conduit 18 thereto. In some instances, a sealing member 15 may be necessary to provide a liquid-tight seal between conduit connector 14 and electrical box 16. Preferably, sealing member 15 is a washer formed of foam rubber having a central bore 17 therethrough as seen in FIGS. 2 and 3. Central bore 17 has a diameter slightly larger than or substantially the same size as the diameter of outer surface 26 of male member 12 so that sealing member 15 can be inserted over first end 20 of male member 12.

Male member or snap nut adaptor 12 is preferably formed as an integral, one-piece, unitary molded member from a substantially rigid plastic material. Male member 12 is a substantially cylindrical, tubular member having first end 20, a second end 22, a substantially cylindrical, smooth inner surface 24 extending between first end 20 and second end 22 to form tubular passageway or throughbore 28, an outer cylindrical surface 26 extending between first end 20 and second end 22, an annular flange 30, and an annular groove 32 as seen in FIGS. 1 and 2.

Throughbore 28 is substantially cylindrical with a longitudinal axis extending between first end 20 and second end 22, and receives electrical wires or conductors therethrough.

Annular flange 30 is integrally formed at second end 22 and extends radially outwardly from outer surface 26 to form a 360° continuous ring-like extension around outer surface 26. Annular flange 30 has an axially facing annular abutment surface 31 extending radially outwardly from outer surface 26. Abutment surface 31 faces longitudinally toward first end 20 for engaging the inside surface 84 of electrical box 16 to limit longitudinal movement of male member 12.

Annular groove 32 extends continuously around the outer surface 26 of male member 12 adjacent first end 20 of male member 12. Annular groove 32 has a substantially rectangular profile in transverse cross-section with first, second and third side surfaces 34–36, respectively. First and third side surfaces 34 and 36 are parallel to one another, and extend substantially perpendicularly and inwardly from outer surface 26. Second side surface 35 extends substantially perpendicularly between first and third side surfaces 34 and 36 and parallel to outer surface 26. Alternatively, groove 32 could be discontinuous or outer surface 26 could have a plurality of grooves 32 to accommodate various thicknesses of electrical boxes.

Female member or conduit connector 14 is a well known conduit connector which is disclosed in U.S. Pat. No. 4,711,472 to Schnell, and specifically illustrated in FIG. 7 of that patent. The entire disclosure of U.S. Pat. No. 4,711,472 to Schnell is hereby incorporated herein by reference. Therefore conduit connector 14 will not be discussed in detail.

Generally, conduit connector 14 is formed as an integral, one-piece, unitary molded member from a substantially rigid plastic material. Conduit connector 14 is a substantially cylindrical tubular member having a first end 37, a second end 38, an inner cylindrical surface 42 extending between first end 37 and second end 38 to form a conduit passageway or throughbore 40, an outer cylindrical surface 44, a first mating coupling member 46, a second mating coupling member 48 and a stop wall 50. First end 37 has a free end with an abutment surface 39 for engaging sealing member 15 or the wall of electrical box 16, if no sealing member is used.

Throughbore 40 is substantially cylindrical with a longitudinal axis extending between first end 37 and second end 38, and has a diameter slightly larger than the diameter of the outer surface 26 of male member 12 so that conduit connector 14 can be inserted over first end 20 of male member 12. Likewise, the diameter of throughbore 40 is slightly larger than the outer diameter of non-metallic conduit 18 so that conduit connector 14 receives one end of conduit 18 within throughbore 40.

First mating coupling member 46 preferably includes four substantially identical latch tabs 60 resiliently coupled to inner surface 42. Each latch tab 60 extends inwardly from inner surface 42 at an acute angle into throughbore 40. Latch tabs 60 are circumferentially aligned and equally spaced 90° apart from the next adjacent latch tabs. While four latch tabs 60 are illustrated, it will be apparent to those skilled in the art from this disclosure that any number of latch tabs may be used.

Each latch tab 60 has an abutment surface 62 and an inclined surface 64. Abutment surfaces 62 extend substantially perpendicularly relative to the longitudinal axis of conduit connector 14, and all lie in the same plane. Inclined surfaces 64 slope inwardly from inner surface 42 and away from first end 37 of conduit connector 14.

Accordingly, inclined surfaces 64 serve as ramps for initially biasing and deflecting latch tabs 60 outwardly as first end 20 of male member 12 is inserted into throughbore 40 of conduit connector 14. Since latch tabs 60 are resiliently coupled to inner surface 42 of conduit connector 14, latch tabs 60 will spring back upon engaging groove 32. Although four latch tabs are shown, any number of latch tabs are appropriate so long as they securely couple connector 14 and male member 12.

Alternatively, latch tabs 60 may be coupled to outer surface 26 or inner surface 24 of snap nut 12, and groove 32 may be formed in inner surface 42 or outer surface 44 of conduit connector 14.

As seen in FIGS. 2 and 3, second mating coupling member 48 is substantially identical to first mating coupling member 46, except that first mating coupling member 46 is a mirror image of second mating coupling member 48. Thus, second mating coupling member 48 can be coupled to conduit 18 as seen in FIG. 3, or coupled to groove 32 of male member 12 upon 180° of rotation of connector 14. Preferably, second mating member 48 includes four substantially identical latch tabs 66 resiliently coupled to inner surface 42. Again, any number of latch tabs can be utilized to securely couple conduit 18 within second throughbore 40. Latch tabs 66 are circumferentially aligned and spaced 90° apart from the next adjacent latch tabs. Each latch tabs 66 is axially aligned with and longitudinally spaced from one of latch tabs 60 of first mating coupling member 46. Each latch tab 66 transversely deflects outwardly upon insertion of the conduit 18 into second throughbore 40 of conduit connector 14. Since latch tabs 66 are resiliently coupled to inner surface 42 of conduit connector 14, latch tabs 66 will spring back upon engaging the grooves of conduit 18 to secure coupling conduit 18 within female member or conduit connector 14.

Stop wall 50 extends radially inwardly from inner surface 42 into second throughbore 40, and is spaced midway between first and second mating coupling members 46 and 48. Preferably, stop wall 50 includes four substantially identical stop segments 72 (only three stop segments 72 are shown in FIGS. 2 and 3). Each stop segment 72 is spaced about 90° from the next adjacent stop segment 72, and is axially aligned with one of latch tabs 60 and one of latch tabs 66. Alternatively, stop wall 50 may extend 360° continuously around the inner surface 42 of connector 14, or be removed so that first end 20 of male member 12 prevents inward movement of conduit 18 in throughbore 40.

Accordingly, the snap-fit coupling mechanism of electrical connector assembly 10 includes abutment surfaces 31 and 36 of the male member or snap nut adaptor 12, and abutment surfaces 39 and 62 of the female member or conduit connector 14. These abutment surfaces 31, 36, 39 and 62 prevent relative longitudinal movement between male and female members 12 and 14 when coupled together. More specifically, abutment surface 31 of flange 30 faces axially in a first longitudinal direction, while abutment surface 36 of groove 32 faces axially in a second longitudinal direction opposite the first longitudinal direction of abutment surface 31. Abutment surface 39 of first end 37 faces in the same direction as abutment surface 36 of groove 32, and in the opposite direction of abutment surface 31 of flange 30 and abutment surfaces 62 of latch tabs 60. Accordingly, abutment surface 31 of flange 30 and abutment surface 39 of connector 14 engage electrical box 16 and sealing member 15 to prevent relative longitudinal movement of electrical connector assembly 10 relative to electrical box 16, while abutment surface 36 of groove 32 and abutment surfaces 62 of latch tabs 60 prevent relative longitudinal movement between male member 12 and female member 14.

Electrical box 16 is preferably a conventional electrical box, and thus will not be discussed or illustrated in detail herein. As seen in FIGS. 1–4, a portion of a wall of electrical box 16 is illustrated, and formed of metal. This wall of electrical box 16 has a first or inside surface 84, a second or outside surface 86 and an opening or knockout 88 extending between surfaces 84 and 86.

Conduit 18 has an outer surface 92 formed of nonmetallic tubing and at least one conductor extends therethrough. Outer surface 92 is ribbed and thus, forms a series of ribs and troughs. Usually a plurality of electrical conductors 94–96 extend through conduit 18. Also, conduit has a diameter just smaller than the diameter of second throughbore 40 and larger than the opening through stop wall 50, so it can be inserted and securely coupled therein by retaining mechanism 48.

Assembly and Operation

As seen in FIGS. 1 and 2, first end 20 of male member 12 is inserted from the inside of electrical box 16 through opening 88 of electrical box 16 until abutment surface 31 of flange 30 abuts against the inside surface 84 of electrical box 16 to prevent male member 12 from completely passing through opening 88 in electrical box 16. This places first end 20 of male member 12 on the second side 86 of electrical box 16.

If necessary, sealing member 15 is then inserted over first end 20 of male member 12 until sealing member 15 abuts against outside surface 86 of electrical box 16. Connector 14 is then also inserted over first end 20 of male member 12 which initially biases latch tabs 60 transversely outwardly until latch tabs 60 engage groove 32. Upon engagement of groove 32, latch tabs 60 move transversely inwardly or snap back to their original positions and into groove 32. Thus, abutment surfaces 62 engage third side surface 36 of groove 32, thereby fixedly coupling conduit connector 14 to male member 12 via a snap-fit. This securely couples and compresses sealing member 15 between the second side 86 of electrical box 16 and the first end 37 of conduit connector 14 to seal the connection therebetween.

Thus, unlike other conduit connectors which often break because they have to be snapped or screwed into the knockout of an electrical box, no such risk of breaking conduit connector 14 exists. Furthermore, since male member 12 extends outwardly from knockout opening 88 into conduit connector 14, male member 12 provides a strong connection which will not shear if stepped on at the construction site.

Figure 4:
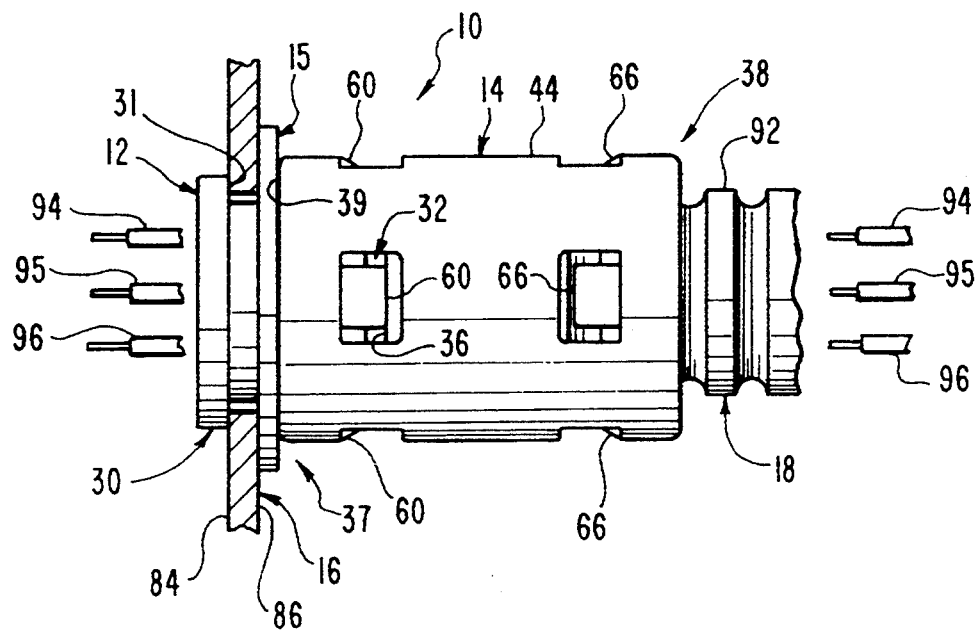
FIG. 4 is a side elevational view of the electrical connector assembly of FIGS. 1-3 in accordance with the present invention fixedly coupled to an electrical box and having electrical conduit coupled therein.

Next, as seen in FIG. 3, conduit 18 is inserted into the open end 38 of connector 14 until it engages stop wall 50, which prevents further insertion of the conduit 18 into throughbore 40. As the conduit 18 is inserted, latch tabs 66 are biased transversely outwardly and inwardly as latch tabs 66 move over the outer ribbed surface 92 of conduit 18. When conduit 18 reaches stop wall 60, tabs 66 snap back to their original positions and between two ribs to securely couple conduit 18 within throughbore 40 of conduit connector 14. Conductors 94–96 extend through the opening 88 in electrical box and outwardly from second end 22 of male member 12, as seen in FIG. 4, and can be connected to other conductors or to an electrical device in box 16 in a conventional manner.

While only the preferred embodiment of the present invention has been chosen to illustrate the invention, it will be understood by those skilled in the art that various changes and modifications can be made herein without departing from the scope of the invention as defined in the appended claims.

What is claimed is:

1. An electrical connector assembly for coupling an electrical conduit with an exterior surface to an opening in a wall, the combination comprising:

a first tubular member having a first end with a groove formed adjacent thereto, a second end with a flange formed adjacent thereto, and a first conduit passageway extending between said first end and said second end, said groove having a first coupling surface facing in a first direction and said flange having a first contacting surface facing in a second direction for engaging a first surface of the wall; and a second tubular member having a first end with a first resilient latch tab formed adjacent thereto, a second end with a second resilient latch tab formed adjacent thereto, and a second conduit passageway extending between said first and second ends of said second tubular member, said first latch tab having a second coupling surface formed thereon for selectively coupling with said first coupling surface of said first tubular member, said second latch tab having a third coupling surface formed thereon for selectively coupling with said first coupling surface of said first tubular member, said first and second ends of said second tubular member having a second and third contacting surface, respectively, for selectively engaging a second surface of the wall facing in a direction opposite to the first surface of the wall, and said second and third coupling surfaces being spaced from said second and third contact surfaces, respectively, so that either of said ends of said second tubular member can be selectively coupled to said first tubular member and either of said ends of said second tubular member can be selectively coupled to the electrical conduit being coupled to the wall by said first and second tubular members.

2. An electrical connector assembly according to claim 1, and further comprising additional first latch tabs resiliently coupled to said second tubular member, each of said additional first latch tabs having said second coupling surface thereon and being circumferentially aligned with said first latch tab and spaced apart from each other.

3. An electrical connector assembly according to claim 2, wherein said groove is an annular and continuous groove for receiving each of said first latch tabs therein.

4. An electrical connector assembly according to claim 1, wherein said groove faces outwardly from said first tubular member, and said second conduit passageway of said second tubular member being sized to receive said first end of said first tubular member therein.

5. An electrical connector assembly according to claim 1, wherein said first and second latch tabs of said second tubular member extend radially inwardly therefrom for engaging the exterior surface of the electrical conduit.

6. An electrical connector assembly according to claim 2, and further comprising additional second latch tabs resiliently coupled to said second tubular member, each of said additional second latch tabs being circumferentially aligned and spaced apart from each other.

7. An electrical connector assembly according to claim 6, wherein each of said first latch tabs is angled inwardly into said second conduit passageway and away from said first end of said second tubular member and each of said second latch tabs is angled inwardly into said second conduit passageway and away from said second end of said second tubular member.

8. An electrical connector assembly according to claim 1, wherein said second tubular member has stop means integrally coupled within said second conduit passageway.

9. An electrical connector assembly according to claim 8, wherein said stop means includes a wall extending inwardly into said second conduit passageway and spaced between said first and second ends of said second tubular member.

10. An electrical connector assembly according to claim 9, wherein said wall is discontinuous and extends circumferentially with said second conduit passage of said second tubular member.

11. An electrical connector assembly according to claim 9, wherein said wall has four stop segments, equally spaced apart.

12. An electrical connector assembly according to claim 11, wherein said first tubular member and said second tubular member are formed of a substantially rigid plastic material.

13. An electrical connector assembly according to claim 12, and further comprising sealing means for sealing the interface between said second tubular member and the second surface of the wall.

14. An electrical connector assembly according to claim 13, wherein said sealing means includes a foam rubber washer with a central bore therethrough for receiving said first end of said first tubular member.

* * * * *